H. C. BROWN.
SPRING WHEEL FOR VEHICLES.
APPLICATION FILED SEPT. 8, 1913.
1,149,624.
Patented Aug. 10, 1915.
3 SHEETS—SHEET 1.
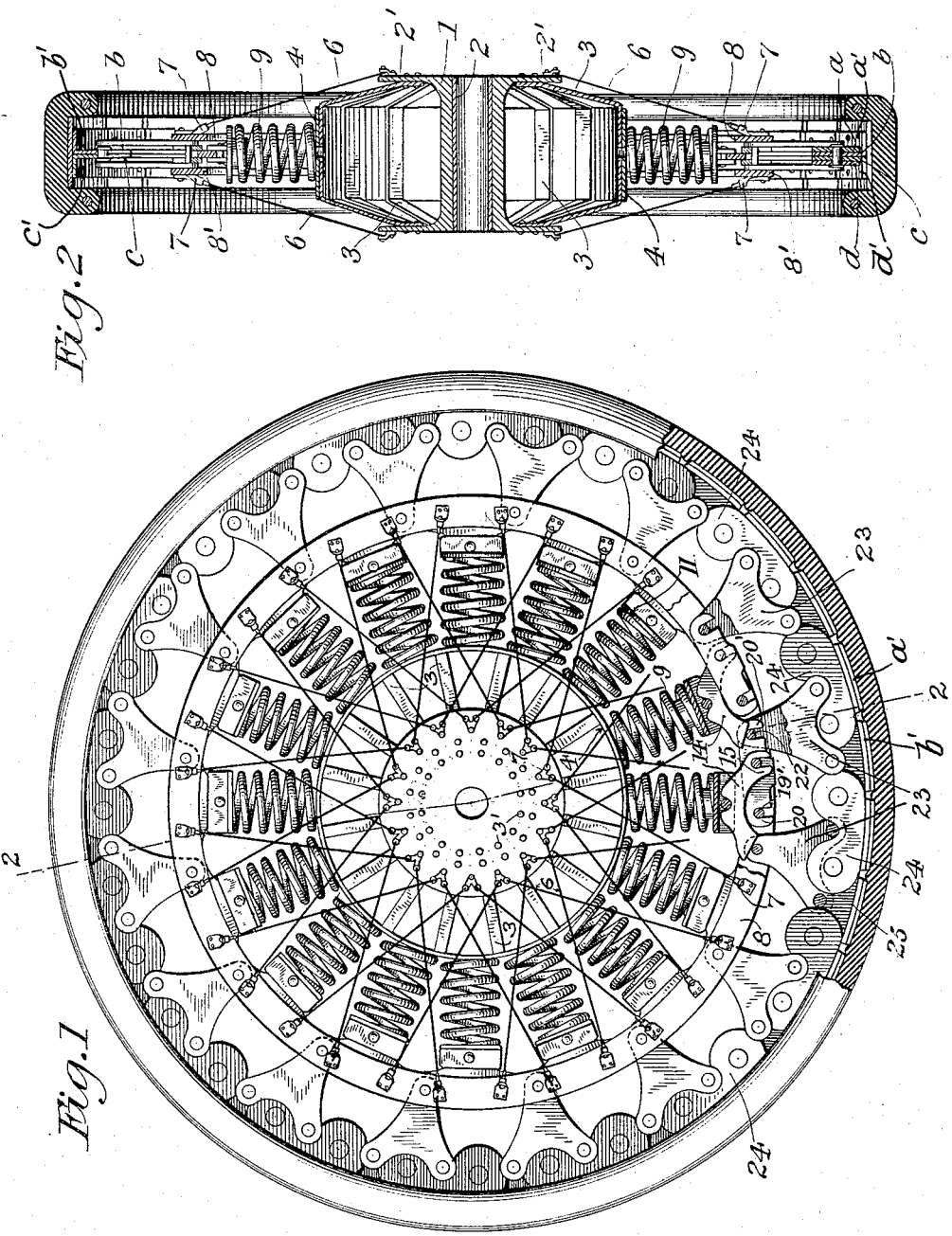

H. C. BROWN.
SPRING WHEEL FOR VEHICLES.
APPLICATION FILED SEPT. 8, 1913.

1,149,624.

Patented Aug. 10, 1915.
3 SHEETS—SHEET 2.

Witnesses:
Raphaël Netter
L. E. Johnston

Inventor:
Henry C. Brown
By his Attorneys,
Merwin & Swearton

H. C. BROWN.
SPRING WHEEL FOR VEHICLES.
APPLICATION FILED SEPT. 8, 1913.
1,149,624.
Patented Aug. 10, 1915.
3 SHEETS—SHEET 3.
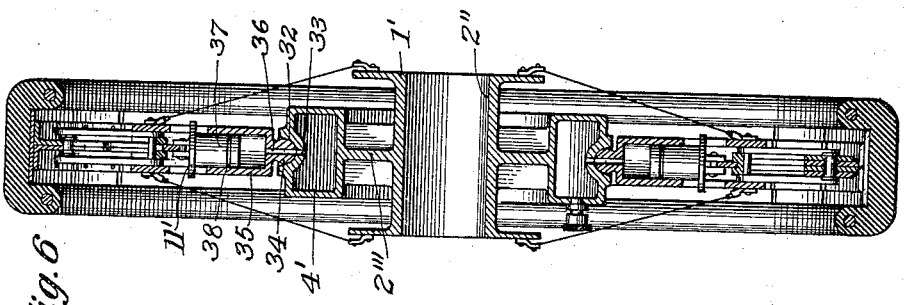
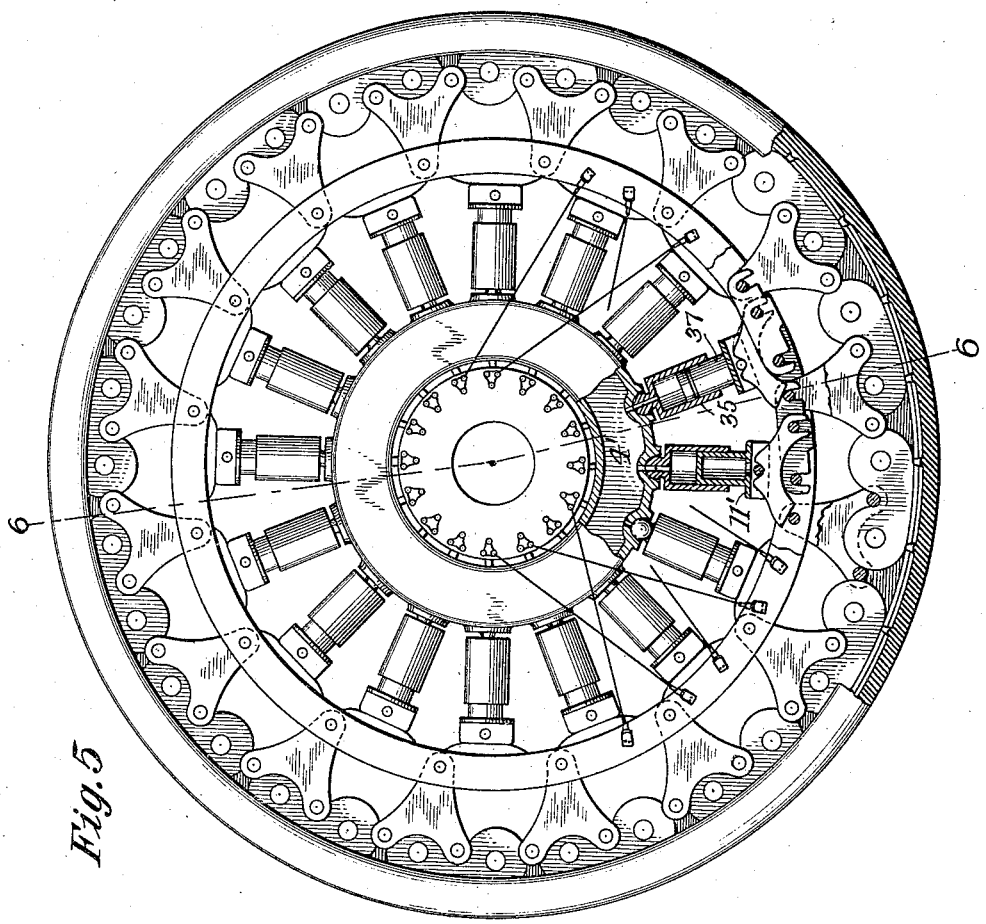

UNITED STATES PATENT OFFICE.

HENRY C. BROWN, OF BROOKLYN, NEW YORK, ASSIGNOR OF ONE-THIRD TO HENRY STOCKMAN, OF ENGLEWOOD, NEW JERSEY, AND ONE-THIRD TO ISAAC C. LOWENTHAL, OF NEW YORK, N. Y.

SPRING-WHEEL FOR VEHICLES.

1,149,624.   Specification of Letters Patent.   Patented Aug. 10, 1915.

Application filed September 8, 1913. Serial No. 788,741.

*To all whom it may concern:*

Be it known that I, HENRY C. BROWN, a citizen of the United States, and resident of Brooklyn, in the county of Kings and State of New York, have invented certain new and useful Improvements in Spring-Wheels for Vehicles, of which the following is a specification.

This invention relates to automatically compensating wheels adapted to receive solid rubber tires which are capable of serving as satisfactory substitutes for wheels equipped with the well known pneumatic tires, and has for its object the provision of a simple and economical yet effective shock-absorbing mechanism which is adapted to normally maintain the rim of the wheel in its original circular form without deformation under ordinary loads and yet render said rim susceptible to deformation in the plane of the wheel upon contact of irregular obstacles or projections in the road bed with its periphery, whereby the desired cushioning effect of a pneumatic tire is obtained.

The invention is fully set forth and described in the accompanying specification and drawings forming a part thereof, in which—

Figure 3:
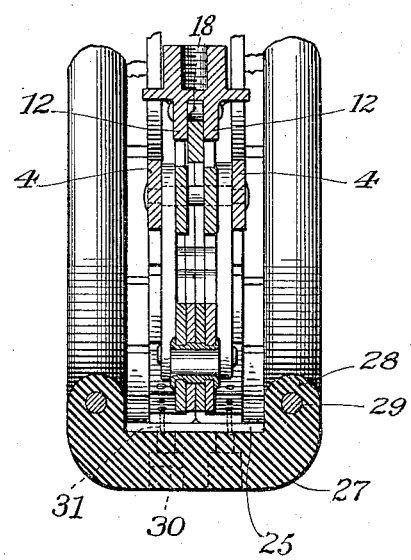
Figure 4:
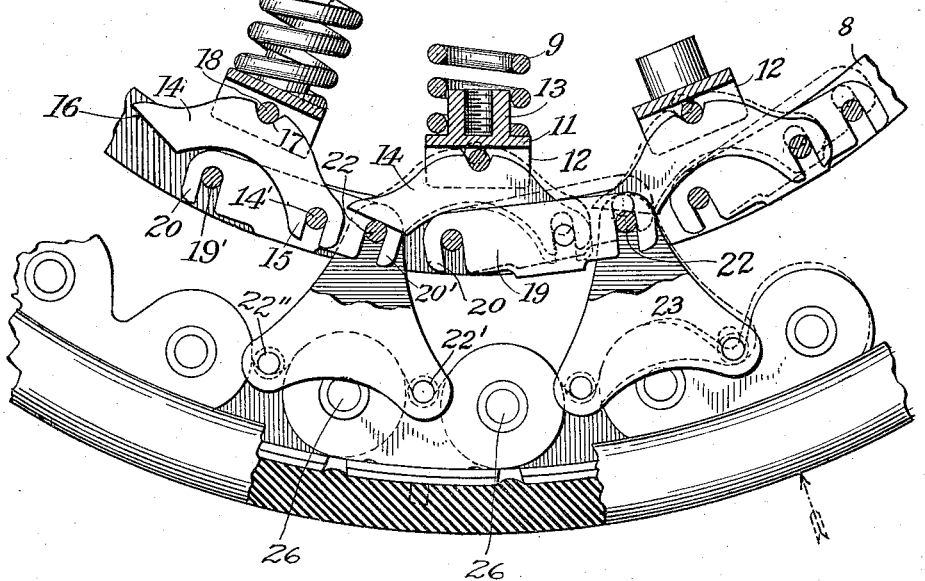

Figure 1 is an elevation of said wheel, with parts broken away, Fig. 2 is a central vertical section on the line 2—2 of Fig. 1, Fig. 3 is an enlarged vertical section of the lower portion of said wheel up to and including the spring seat, Fig. 4 is an elevation partly broken away of substantially the same portion shown in Fig. 3, Fig. 5 is an elevation partly broken away of a modified construction, and Fig. 6 is a vertical section along the line 6—6 of Fig. 5.

Referring to the drawings and the construction shown therein the reference numeral 1 designates the hollow cylindrical hub of the wheel, the same being provided with a bearing 2 adapted to receive the axle of the vehicle. The periphery of said hub on either side thereof is extended as annular webs 2' which are provided with projecting sheet metal spokes 3, secured to said webs by rivets 3' and which extend across the inner face of and are secured to an inner ring comprising a flat metal band 4. Suitable intersecting wire spokes 6 are secured at one end to said hub plate and are secured at their opposite ends to an outer ring comprising duplicate sections, 8, 8' by suitable spoke attachments 7 which are riveted to said outer ring. A series of powerful coil-springs 9 are mounted in the well known manner intermediate said inner ring 4 and outer ring 8, 8' said springs at their inner ends being suitably secured to bear against the outer surface of said inner ring, and at their outer ends being suitably secured to bear against the rocking spring-seats. Each seat comprises a circular bearing plate 11 having parallel upwardly extending transverse flanges 12 and inwardly projecting hollow necks 13, which necks are threaded to permit of the same being temporarily connected to the end of a rod, which rod is intended to be threaded through the aperture in said inner ring, and thereby said spring seats can be optionally elevated against the action of the coil-springs 9 when it is desired to seat said spring seats upon a single supporting link 14 adapted to receive the same. Said link 14 is, as shown, substantially arc shaped and is provided with a forked end 15 and a square end 16. A substantially semicircular depression 17 serves as a seat for a pivot 18 which is mounted in the two flanges 12 of said rocking spring seat.

An anchor link 19 provided with hooks 20, 20' respectively in its opposite ends, is hooked by means of said hook 20 over a bolt 19' which rigidly connects the duplicate rings 8, 8' and by means of the hook 20' is hooked over the upper pivot 22 of the three pivots 22, 22', 22'', which three pivots connect the duplicate triangular plates of a saddle 23. The anchor link 19 consists of duplicate plates adapted to extend respectively on both sides of said spring link. The two plates forming said saddle 23 are adapted to respectively fit outside of each of said plates forming said anchor link as shown in Fig. 4. The pivots 22', 22'' at the respective outer corners of said saddle are adapted to ride respectively in the seats or recesses formed in peripheral links 24 each of which consists of two plates or sections *a*, *b* or *c*, *d* respectively, the respective sections *a* and *d* being provided at their peripheral edges, as shown with oppositely extending flanges *a'* and *d'* respectively, the sections $b$ and $c$ being provided at their peripheral edges with oppositely extending flanges $b'$ and $c'$ respectively, all of said flanges being adapted to receive rim plates 25. As shown in Fig. 4 the two outer peripheral links extend in one direction and the two inner peripheral links $b$ and $c$ extend in the opposite direction, the same being all mounted at one end upon a common pivot 26. A solid rubber tire 27, having inwardly extending annular flanges 28 is preferably secured to said sectional rim plates 25, there being as shown a slight space intermediate the respective rim plates. Preferably also said tires are strengthened by means of marginal wires 29 in the well known manner, but obviously any suitable tire may be employed in lieu of the type herein shown. In order to prevent the creeping of the tire, the tire may be bolted on to said rim plates 25 by means of sunken bolts 30, and similarly said rim plates are secured to the flanges $a'$, $d'$, $b'$ and $c'$ respectively by means of rivets 31.

As shown in Fig. 4, the arc shaped seats of the pivots 22' and 22'' are of different curvature. The said pivot 22' corresponds to the arc described from the center of said pivot, and having the same radius as said pivot, whereas the seat of the pivot 22'' corresponds to an arc twice this radius and is described from the center of the pivot 22''. Thereby the pivot 22' will be virtually locked against peripheral movement, whereas the pivot 22'' will be free to roll along its seat and thus permit of the slight movement of the end of said saddle in which said pivot is mounted, whereby the binding or buckling of said saddle due to the sudden upward thrust of the peripheral links 24 will be prevented.

The coaction of the various parts of said wheel is apparent from the foregoing description, the change of position thereof being particularly illustrated with respect to the saddle links in the dotted lines of Fig. 4, it being evident that when a gradual or sudden pressure is exerted upon the elastic tire 27, upon the same striking some obstruction or irregular projection in the road bed, which pressure is in excess of the elastic radial limit of said tire, that the pressure will be transmitted directly to the adjacent rim plate 25, and thence to the peripheral links 24. The latter will then be either thrust bodily upward or one end thereof will be elevated by said pressure depending upon whether the same is applied centrally or at one end thereof. Thereupon, since the seat of the rivet 22', as stated, is of greater curvature than the seat of the rivet 22'', as stated, the upward movement of the ends of said saddle at the corner carrying the pivot 22' will be greater than that of the opposite corner carrying the pivot 22'', as the corner carrying the pivot 22'' will tend to roll peripherally along its seat under the sections $b$ and $c$ of the link 24. As a result the pivot 22 at the upper end of the saddle will also tend to travel in a clock-wise direction along the inclined face 16 of the single link 14, and thereby tend to prevent upsetting of the springs 9. The anchor links 19 which are anchored at the end 20 will in turn swing upwardly in the arc of a circle having a bolt 19', which connects the two sections of the outer ring together, as a center, this action taking place simultaneously with the upward movement of the saddle 23. The single link 15 will accordingly be thrust upwardly both by the pivots 22 and 14' respectively, but the greatest thrust will obviously be imparted from the pivot 22, since the pivot 14' is intermediate the pivot 22 and the pivot 19' and there is a correspondingly greater leverage at this point than at the point corresponding to the pivot 22. The upward movement of the single link 14 will raise the seat 17 thereof and pressure will be exerted upon the pivot 18 of the spring seat carrying the springs 9, whereby the latter will be compressed against the inner rigid ring 4. Obviously however, because of the rigid connection between this latter ring and the hub, there will be no movement of the hub itself with respect to the inner rim or ring 4, and likewise owing to the rigid construction employed, the peripheral links will be locked against rotation with respect to the hub so that the wheel will combine rigidity to resist torque with resiliency in carrying the load.

In practice for a five passenger automobile, the toneau weighing about 3100 pounds unloaded, the spokes 3 are 1/8" x 5/8", the inner ring is 13" in diameter, the springs 9 are 2 1/2" in diameter by 4" in length and of 7/16" steel wire being under 783 pounds compression. The ring 8 is 23" in diameter by 1 1/2" in width. The single link 14 is 1/4" thick, and the anchor link 19 is 1/2" in thickness by 2" in height, and the two respective plates thereof are preferably 1/4" apart. The total weight of the wheel is approximately 145 pounds.

The foregoing invention was devised with a view to simplifying and reducing the weight as well as the cost of the cushion tread vehicle wheel described in my Patent No. 976,846, granted November 29, 1910.

Various departures from the exact construction herein described may obviously be made without departing from the spirit of the invention as covered by the appended claims. One of such constructions for example comprises the modified elastic connections as shown in Figs. 5 and 6 as a substitute for the coil springs previously described. Such construction comprises the following:—A hollow cylindrical hub 1' having preferably a bearing 2'', which is adapted to receive various standard axles, is provided with an integrally extending central annular web 2'''. This central web is in turn integrally secured to a hollow ring 4' which is adapted to serve as a fluid reservoir, preferably containing air. The periphery of said hollow ring is provided with a series of semi-circular sockets 32 which are in communication with the interior of said ring through apertures 33, and are adapted to serve as seats for a series of balls 34 respectively mounted on the end of cylinders 35. A port 36 extends through each ball and is adapted to permanently register with said slotted opening 33, and the outer surface of said ball and the inner surface of said socket are ground so as to make an air tight fit therebetween. The inner wall of said cylinder is likewise ground to receive a tight fitting plunger or piston 37, which if desired may be provided with annular grooves adapted to receive oil to make a liquid seal therebetween as indicated by the reference numeral 38. Said piston is integrally formed as an extension of the bearing plate 11' of the ring seat. Otherwise the construction shown is substantially identical with that previously described.

The operation of the modified mechanism is evident from the above description, it being merely necessary to fill the reservoir of the hollow ring 4' with a fluid, preferably air under pressure, whereupon the air will pass through the aperture 33 and port 36 into the cylinder 35 and serve to elastically support the piston 38 in substantially the same manner as the coil springs described in the previous construction.

Having thus described my invention what I claim and desire to secure by Letters Patent is:

1. In a circular spring-wheel, the combination comprising pivotally connected peripheral members capable of movement along a chord of said wheel, elastic means normally maintaining said members in the form of a circle, an inner rigid rim elastically connected to said peripheral members, a rigid hub fixedly connected to said inner rim, and a rigid outer rim pivotally connected to said peripheral members, means for rigidly connecting said outer rim to said hub, and a flexible tire enveloping said peripheral members.

2. In a spring-wheel, the combination comprising a rigid hub, a rigid rim fixedly secured thereto, a second rigid rim connected to said hub by means of wire spokes and enveloping said rim, an endless series of interlocked peripheral links enveloping said second rim and pivotally secured thereto, and elastic means pivotally connected to said second rim and said series of peripheral links and interposed between said rims, whereby said peripheral links are normally maintained in the form of a circle and the movement thereof along a chord of said wheel is permitted, and a flexible tire enveloping said series of peripheral links.

3. In a spring-wheel, the combination comprising a hub, an inner rigid rim fixedly secured thereto, a second rigid rim enveloping said rim and distant therefrom, secured to said hub by rigid means, an endless series of pivotally connected peripheral links each consisting of a plurality of duplicate sections, and each of said sections being provided with marginal peripheral flanges, rim plates secured to said flanges, a flexible tire secured to said rim plate, saddle plates swiveled on the inner edges of said peripheral links, means for permitting of slight peripheral movement of one end of said saddle plates along said peripheral links and for preventing movement of the entire saddle plates with respect to said peripheral links and peripherally thereof, anchor links pivotally connecting the inner ends of said saddle plates with said outer rigid rim, auxiliary links pivotally mounted upon said anchor links at a point intermediate the respective ends of the latter and being slidably supported at one end upon said saddle plates, spring-seats swiveled upon the said auxiliary links and intermediate the ends of the latter, coil springs mounted intermediate said spring seats and said rigid inner rim.

4. In a spring wheel, the combination of a relatively flexible tire, a rim composed of relatively jointed sections having portions thereof connected to said tire, a rigid rim within said jointed rim, a series of members movably mounted on said rigid rim, resilient means for resisting inward movement of said members, and connections between said members and said rim sections whereby each rim section is connected with a plurality of said members and each member is connected with a plurality of said rim sections.

5. In a spring wheel, the combination of a flexible tire, a rim composed of relatively jointed sections having portions thereof connected to said tire, a rigid rim within said jointed rim, a series of levers fulcrumed on said rigid rim, resilient means for resisting inward movement of said levers, and connections between said levers and said rim sections whereby each rim section is connected with a plurality of said levers and each lever is connected with a plurality of said rim sections.

6. In a spring wheel, the combination of a flexible tire, a rim composed of a plurality of relatively jointed sections having portions thereof attached to said tire, a rigid rim within said jointed rim, a plurality of levers fulcrumed to said rigid rim, members pivotally interconnecting said levers. springs for resiliently resisting the inward movement of said last mentioned members, and connecting members engaging said rim sections and also directly engaging said levers and said interconnecting members between said levers.

Signed at New York in the county of New York and State of New York this sixth day of September, 1913.

HENRY C. BROWN.

Witnesses:
E. J. ESSELSTYN,
W. H. SWENARTON.